(12) United States Patent
Ishizuka et al.

(10) Patent No.: US 11,351,954 B2
(45) Date of Patent: Jun. 7, 2022

(54) AIRBAG DEVICE

(71) Applicant: HONDA MOTOR CO., LTD., Tokyo (JP)

(72) Inventors: Yuji Ishizuka, Wako (JP); Hitoshi Higuchi, Wako (JP); Yuichi Mashiko, Wako (JP); Tatsuya Narikawa, Wako (JP); Ryosuke Seki, Wako (JP); Kazuki Hikida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/623,417

(22) PCT Filed: Jul. 7, 2017

(86) PCT No.: PCT/JP2017/024946
§ 371 (c)(1),
(2) Date: Dec. 17, 2019

(87) PCT Pub. No.: WO2019/008740
PCT Pub. Date: Jan. 10, 2019

(65) Prior Publication Data
US 2021/0146873 A1  May 20, 2021

(51) Int. Cl.
*B60R 21/235* (2006.01)
*B60R 21/203* (2006.01)

(52) U.S. Cl.
CPC .......... *B60R 21/235* (2013.01); *B60R 21/203* (2013.01); *B60R 2021/23509* (2013.01)

(58) Field of Classification Search
CPC ............... B60R 21/235; B60R 21/203; B60R 2021/23509; B60R 21/239; B60R 21/276; B60R 2021/2765; B60R 21/30
See application file for complete search history.

(56) References Cited

U.S. PATENT DOCUMENTS 6,382,662 B1 * 5/2002 Igawa .................. B60R 21/233
  280/729
6,457,741 B2 * 10/2002 Seki ...................... B60R 21/207
  280/730.2

(Continued)

FOREIGN PATENT DOCUMENTS

CN   101376379    3/2009
CN   102205828    10/2011

(Continued)

OTHER PUBLICATIONS

Japanese Notice of Allowance for Japanese Patent Application No. 2019-528299 dated Dec. 8, 2020.

(Continued)

*Primary Examiner* — Paul N Dickson
*Assistant Examiner* — Timothy Wilhelm
(74) *Attorney, Agent, or Firm* — Amin, Turocy & Watson, LLP

(57) ABSTRACT

Provided is an airbag device including an airbag body having a first base fabric and a second base fabric, wherein the first base fabric and the second base fabric have an outer circumferential section and an outer circumferential section that are joined to each other while overlapping each other, a first base fabric joining section formed by joining a plurality of predetermined portions, spaced apart from each other in a circumferential direction of the first base fabric is provided on an outer circumferential side of the first base fabric, and a second base fabric joining section formed by joining a plurality of predetermined portions, spaced apart from each other in a circumferential direction of the second base fabric is provided on an outer circumferential side of the second base fabric.

7 Claims, 8 Drawing Sheets

(56) References Cited

U.S. PATENT DOCUMENTS

| | | | | |
|---|---|---|---|---|
| 7,000,943 | B2* | 2/2006 | Hasebe | B60R 21/233 |
| | | | | 280/729 |
| 7,118,127 | B2* | 10/2006 | Damm | B60R 21/239 |
| | | | | 280/739 |
| 7,490,849 | B2* | 2/2009 | Taniyama | B60R 21/203 |
| | | | | 280/728.2 |
| 7,770,921 | B2* | 8/2010 | Mueller | B60R 21/2346 |
| | | | | 280/739 |
| 7,883,110 | B2* | 2/2011 | Pausch | B60R 21/239 |
| | | | | 280/739 |
| 8,342,570 | B2* | 1/2013 | Higuchi | B60R 21/239 |
| | | | | 280/739 |
| 8,414,023 | B2* | 4/2013 | Naganawa | B60R 21/239 |
| | | | | 280/743.2 |
| 8,480,124 | B2* | 7/2013 | Rickenbach | B60R 21/2346 |
| | | | | 280/730.2 |
| 8,608,199 | B2* | 12/2013 | Fischer | B60R 21/231 |
| | | | | 280/743.1 |
| 8,651,521 | B2* | 2/2014 | Kuhne | B60R 21/239 |
| | | | | 280/739 |
| 8,925,962 | B2* | 1/2015 | Yamada | B60R 21/2334 |
| | | | | 280/731 |
| 9,039,039 | B2* | 5/2015 | Higuchi | B60R 21/239 |
| | | | | 280/739 |
| 10,899,309 | B2* | 1/2021 | Hotta | B60R 21/203 |
| 2003/0222446 | A1* | 12/2003 | Soderquist | B60R 21/233 |
| | | | | 280/743.1 |
| 2009/0224520 | A1* | 9/2009 | Higuchi | B60R 21/239 |
| | | | | 280/740 |
| 2014/0097602 | A1 | 4/2014 | Nam | |
| 2016/0221524 | A1* | 8/2016 | Sekino | B60R 21/235 |

FOREIGN PATENT DOCUMENTS

| | | |
|---|---|---|
| CN | 102574498 | 7/2012 |
| CN | 102963331 | 3/2013 |
| CN | 103221267 | 7/2013 |
| CN | 106573592 | 4/2017 |
| JP | 04-056652 | 2/1992 |
| JP | 2011-046370 | 3/2011 |
| JP | 2015-058919 | 3/2015 |
| JP | 2016-141279 | 8/2016 |
| WO | 2012/098925 | 7/2012 |
| WO | 2017/090772 | 6/2017 |

OTHER PUBLICATIONS

International Search Report and Written Opinion for International Application Serial No. PCT/JP2017/024946 dated Aug. 29, 2017, 6 pages.

Chinese Office Action for Chinese Patent Application No. 201780091922.X dated Jul. 12, 2021.

* cited by examiner

AIRBAG DEVICE

TECHNICAL FIELD

The present invention relates to an airbag device.

BACKGROUND ART

An airbag device is configured to constrain an occupant by, for example, expanding and deploying an airbag body in a passenger compartment using a gas supplied from an inflator when a large impact is input to a vehicle.

For example, an airbag device disclosed in Patent Literature 1 has an airbag body including a plurality of base fabrics. The plurality of base fabrics have outer circumferential sections that are joined to each other while overlapping each other.

CITATION LIST

Patent Literature

[Patent Literature 1]
Japanese Unexamined Patent Application, First Publication No. H04-56652

SUMMARY OF INVENTION

Technical Problem

Incidentally, a large impact may be input to a vehicle from a side obliquely in front of the vehicle. Here, when an occupant obliquely comes into contact with an airbag body that is deployed, the occupant needs to be constrained while a movement of the occupant is followed even in this case.

In consideration of the above-mentioned circumstances, the present invention is directed to providing an airbag device capable of constraining an occupant while following a movement of the occupant even when the occupant obliquely comes into contact with an airbag body that is deployed.

Solution to Problem

An airbag device of an aspect according to the present invention employs the following configurations in order to solve the above-mentioned problems.

(1) An airbag device of an aspect according to the present invention includes an airbag body having a plurality of base fabrics, wherein the plurality of base fabrics have outer circumferential sections that are joined to each other while laid over each other, and joining sections at which a plurality of predetermined portions spaced apart in a circumferential direction of the base fabric are joined are provided on an outer circumferential side of at least one base fabric of the plurality of base fabrics.

(2) In the airbag device of the aspect according to the present invention, in the airbag device of the aspect of the above-mentioned (1), a cutout section is formed in the base fabric from an outer circumferential edge to a center of the base fabric in a radial direction of the base fabric, both side portions of the cutout section in the circumferential direction are the plurality of predetermined portions, and the joining section is formed by joining the predetermined portions of both side portions.

(3) In the airbag device of the aspect according to the present invention, in the airbag device of the aspect of the above-mentioned (2), the plurality of base fabrics include first base fabrics facing an occupant upon deployment of the airbag body; and second base fabrics disposed on a side of the first base fabric away from the occupant, a first cutout section as the cutout section is provided in the first base fabric, a second cutout section as the cutout section is provided in the second base fabric, and a depth dimension of the second cutout section of the second base fabric in the radial direction is larger than that of the first cutout section of the first base fabric in the radial direction.

(4) In the airbag device of the aspect according to the present invention, in the airbag device of the aspect of any one of the above-mentioned (1) to (3), portions between the plurality of predetermined portions overlap each other to form an overlapping section, and the overlapping section is disposed in the airbag body.

(5) In the airbag device of the aspect according to the present invention, in the airbag device of the aspect of any one of the above-mentioned (1) to (4), the joining sections are formed in a linear shape in a radial direction of the base fabric from an outer circumferential edge toward a center of the base fabric.

(6) In the airbag device of the aspect according to the present invention, in the airbag device of the aspect of any one of the above-mentioned (1) to (5), a restricting section configured to connect the plurality of base fabrics and restrict deployment of the airbag body is provided in the airbag body.

(7) In the airbag device of the aspect according to the present invention, in the airbag device of the aspect of any one of the above-mentioned (1) to (6), the airbag device is disposed in a steering wheel.

(8) In the airbag device of the aspect according to the present invention, in the airbag device of the aspect of the above-mentioned (7), the joining sections are disposed at positions corresponding to spoke sections of the steering wheel in a state in which the airbag body is deployed.

Advantageous Effects of Invention

According to the aspect of the above-mentioned (1), since the joining section is provided on at least one base fabric of the plurality of base fabrics, the airbag body can be mainly deployed in the thickness direction of the airbag body while restricting deployment of the airbag body in the widthwise direction using the joining section. Accordingly, the deployed airbag body is formed in a tubular shape having a thickness larger than that of the deployed airbag body in the related art. Accordingly, the airbag device as described herein can follow a movement of the occupant and constrain the occupant because the airbag body has a thickness larger than that in the related art even when the occupant obliquely comes into contact with the deployed airbag body.

According to the aspect of the above-mentioned (2), since the cutout section is provided in the base fabric and the predetermined portions of both side portions of the cutout section are joined to form the joining section, an amount of the base fabric used can be reduced in comparison with an airbag body having no cutout section. Accordingly, in the airbag body as described herein, a volume when folded and accommodated therein can be reduced in comparison with the airbag body having no cutout section. Further, since in the airbag body as described herein an amount of the base fabric used can be reduced in comparison with the airbag body having no cutout section, contact between the predetermined portions of the base fabric upon deployment is minimized. Accordingly, the airbag device as described herein can be smoothly deployed.

According to the aspect of the above-mentioned (3), since the depth dimension of the second cutout section of the second base fabric in the radial direction is larger than that of the first cutout section of the first base fabric in the radial direction, when the airbag body is deployed, the first base fabric is flatter than the second base fabric and spreads in the widthwise direction, and the second base fabric has a tubular shape having a minimum diameter and thickness smaller than the first base fabric. Accordingly, in the airbag device as described herein, since the first base fabric stably supports the occupant even when the occupant obliquely comes into contact with the deployed airbag body and the tubular second base fabric having a thickness larger than that of the first base fabric can follow a movement of the occupant, the occupant can be effectively constrained.

According to the aspect of the above-mentioned (4), the overlapping section is disposed in the airbag body. Accordingly, the airbag body can prevent interference of the overlapping section with the other peripheral member outside the airbag body upon deployment. Accordingly, the airbag device as described herein can be smoothly deployed.

According to the aspect of the above-mentioned (5), the joining sections are formed in a linear shape in the radial direction of the base fabric from the outer circumferential edge toward the center of the base fabric. Accordingly, the airbag body is deployed in the thickness direction while further restricting deployment in the widthwise direction. Accordingly, the airbag device as described herein can follow a movement of the occupant and constrain the occupant even when the occupant obliquely comes into contact with the deployed airbag body.

According to the aspect of the above-mentioned (6), the restricting section configured to connect the plurality of base fabrics and restrict deployment of the airbag body is provided in the airbag body. Accordingly, the airbag body can restrict a deployment amount of the airbag body in the thickness direction using the restricting section such that, for example, slack occurs on a side surface of the airbag body upon deployment. Accordingly, since the airbag device as described herein stabilizes a deployment movement of the airbag body and can easily follow the occupant even when the occupant obliquely comes into contact with the deployed airbag body, the occupant can be constrained while the movement of the occupant is followed.

According to the aspect of the above-mentioned (7), the airbag device is disposed in the steering wheel. Accordingly, the airbag device as described herein can follow a movement of the driver and constrain the driver even when the driver who is an occupant obliquely comes into contact with the deployed airbag body.

According to the aspect of the above-mentioned (8), the joining sections are disposed at positions corresponding to the spoke sections of the steering wheel. Accordingly, when the airbag body is deployed, since the deployment amount of the joining section is minimized such that it is smaller than that of portions other than the joining section, interference of the joining sections with the spoke sections upon deployment can be minimized. Accordingly, the airbag device as described herein can be smoothly deployed. In addition, when the airbag body is deployed, since the deployment amount of the joining section is minimized to be smaller than that of the other portion than the joining section, reaction with respect to the spoke sections and rebounding from the spoke sections when the airbag body is deployed can be minimized. Accordingly, the airbag device as described herein can follow a movement of the occupant and constrain the occupant even when a deployment movement of the airbag body is stabilized and the occupant obliquely comes into contact with the deployed airbag body.

DESCRIPTION OF EMBODIMENTS

Figure 1:
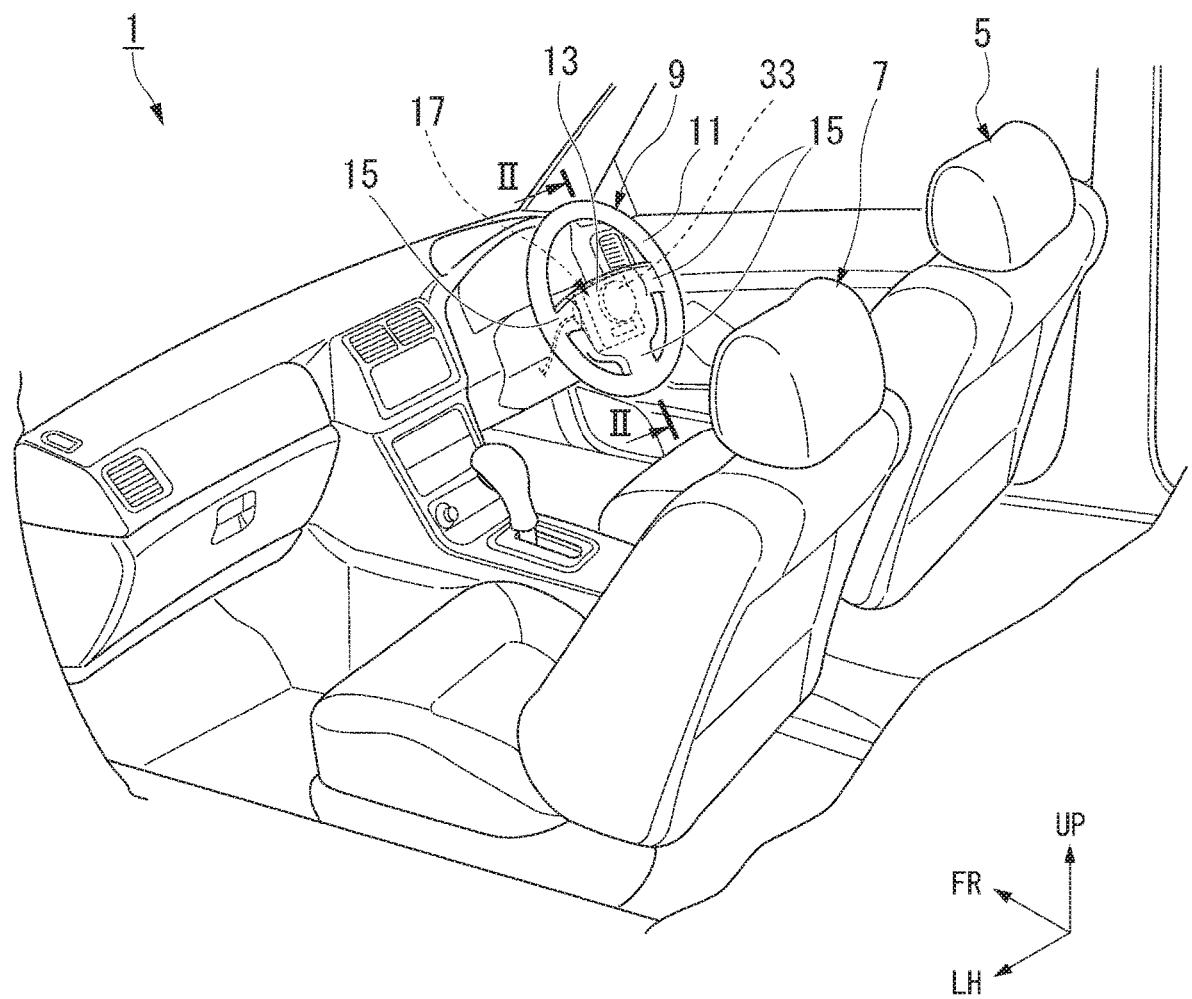
FIG. 1 is a perspective view showing an inside of a passenger compartment of a vehicle including an airbag device of an embodiment of the present invention.

Hereinafter, an embodiment of the present invention will be described with reference to the accompanying drawings.

Further, in the drawings used in the following description, an arrow LH indicates a leftward direction with respect to a vehicle, an arrow FR indicates a forward direction with respect to the vehicle, and an arrow UP indicates an upward direction with respect to the vehicle. In addition, directions of forward, rearward, leftward, rightward, upward and downward in the following description are the same as directions in a vehicle described below unless the context clearly indicates otherwise. In addition, in the embodiment, a vehicle 1 in which a driver's seat 5 is disposed on a right side of the vehicle 1 and a passenger seat 7 is disposed on a left side of the vehicle 1 will be described.

FIG. 1 is a perspective view showing an inside of a passenger compartment of the vehicle including an airbag device of an embodiment of the present invention.

As shown in FIG. 1, an airbag device 17 is accommodated in a steering wheel 9 disposed in front of the driver's seat 5.

The steering wheel 9 includes a rim section 11, an airbag device accommodating section 13, and a plurality of spoke sections 15. The rim section 11 is formed in an annular shape. The rim section 11 is a portion gripped by a driver. The airbag device accommodating section 13 is disposed on a central portion of the rim section 11. The airbag device accommodating section 13 is formed in a hollow shape. The airbag device 17 is accommodated in the airbag device accommodating section 13. The plurality of spoke sections 15 connect the rim section 11 and the airbag device accommodating section 13.

Figure 2:
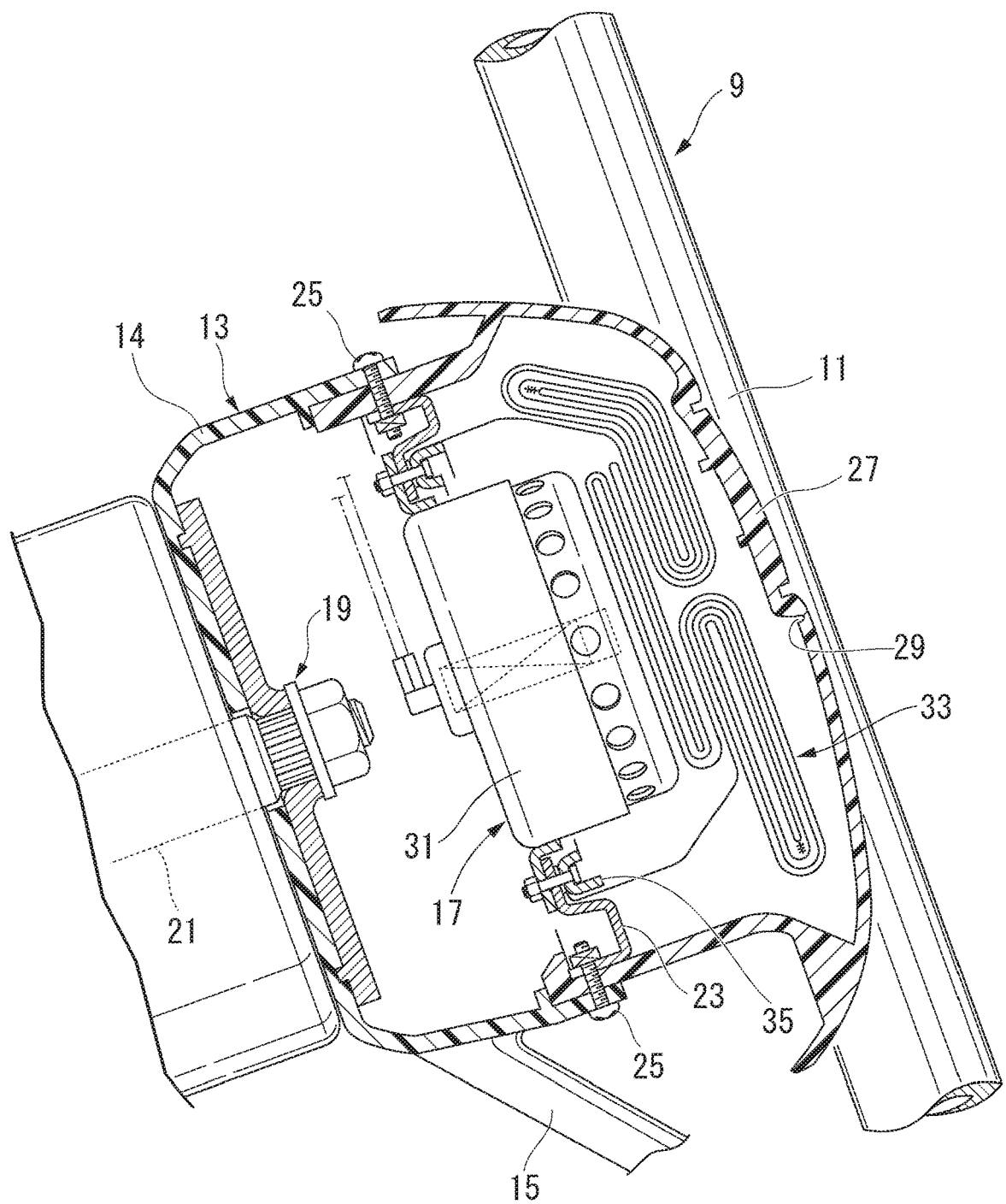
FIG. 2 is a cross-sectional view taken along line II-II in FIG. 1.

FIG. 2 is a cross-sectional view taken along line II-II in FIG. 1.

As shown in FIG. 2, the airbag device accommodating section 13 is constituted by a cup-shaped front cover 14, and a rear cover 27 provided to close the front cover 14. The front cover 14 and the rear cover 27 are fixed by a plurality of bolts 25.

A rear end of a steering shaft 21 is fixed to a front side of the airbag device accommodating section 13 by a fixing means 19. A retainer 23 is disposed in the airbag device accommodating section 13. The retainer 23 is fixed to an inner circumferential surface of the airbag device accommodating section 13 by the bolts 25. The airbag device 17 is attached to the retainer 23.

The airbag device 17 includes an inflator 31, an airbag body 33 and a fixing ring 35.

The inflator 31 is attached to the inner circumferential surface of the airbag device accommodating section 13 via the retainer 23. The inflator 31 is connected to a collision detecting sensor configured to detect a collision of the vehicle 1. The inflator 31 generates and injects a gas when the collision detecting sensor detects the collision of the vehicle.

The airbag body 33 is formed to be deployable. The airbag body 33 is disposed on an occupant side of the inflator 31 in a folded state. The folded airbag body 33 is deployed by supplying a gas from the inflator 31.

The fixing ring 35 is formed in an annular shape. The fixing ring 35 is disposed in the airbag body 33. The fixing ring 35 fixes the airbag body 33 to the retainer 23.

A tear line 29 is formed in an inner surface of the rear cover 27 of the airbag device accommodating section 13. The tear line 29 is configured to accelerate breaking of the rear cover 27. The rear cover 27 is broken along the tear line 29 when a pressing force due to deployment of the airbag body 33 is received, and the airbag body 33 is deployed toward the driver's seat 5 from between the broken tear lines 29.

Figure 3:
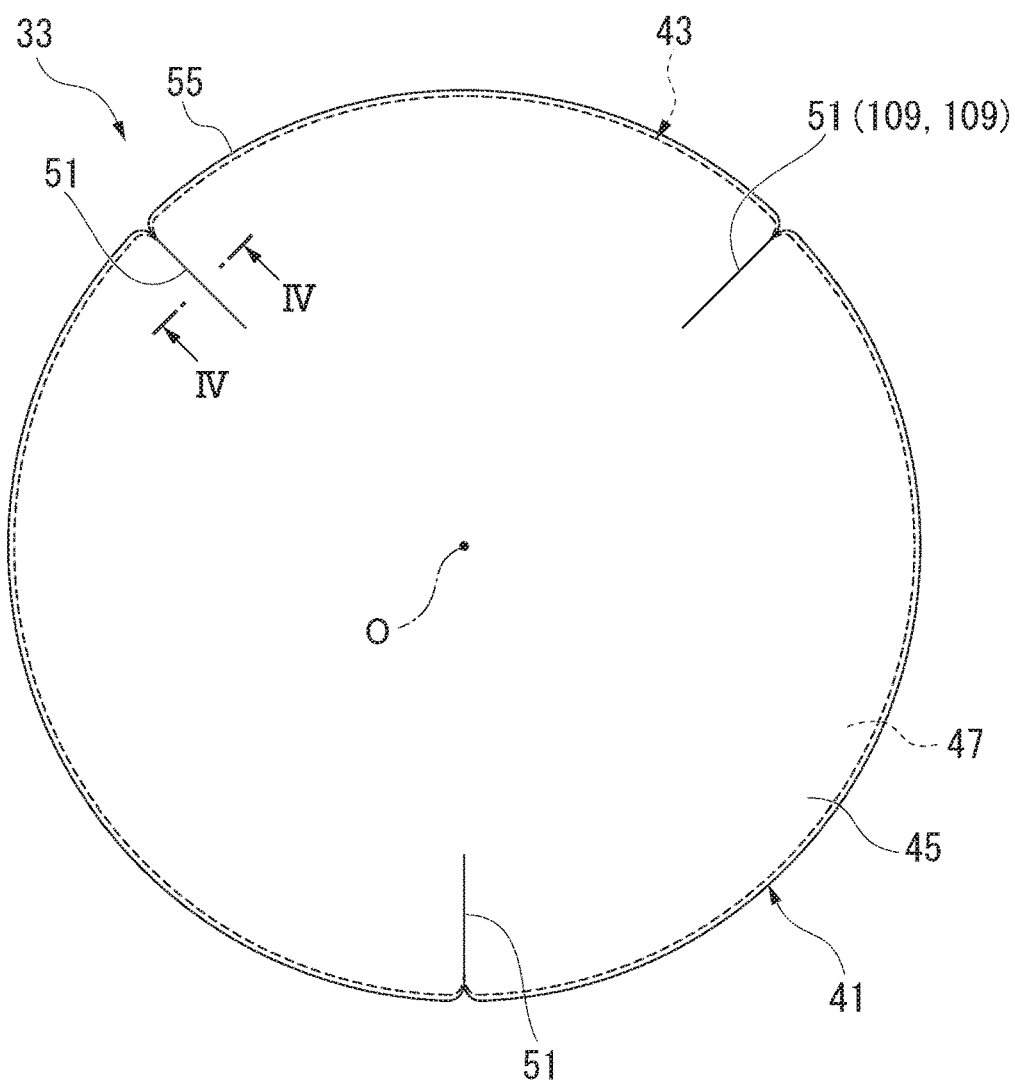
FIG. 3 is a plan view of an airbag body before deployment when seen from a side of an occupant.

FIG. 3 is a plan view of the airbag body before deployment when seen from the side of the occupant.

As shown in FIG. 3, the airbag body 33 is formed in a circular shape when seen in a plan view. The airbag body 33 includes a first base fabric 41 and a second base fabric 43. The first base fabric 41 and the second base fabric 43 are joined by sewing an outer circumferential section 45 of the first base fabric 41 and an outer circumferential section 47 of the second base fabric 43 to each other when the fabrics overlap each other.

The first base fabric 41 is disposed on the side of the occupant upon deployment of the airbag body 33. The first base fabric 41 is a circular fabric when seen in a plan view. A plurality of first base fabric joining sections 51 are provided on an outer circumferential side of the first base fabric 41. The plurality of first base fabric joining sections 51 are disposed to be spaced apart from each other in a circumferential direction of the first base fabric 41.

The plurality of first base fabric joining sections 51 are disposed to correspond to the spoke sections 15 (see FIG. 1) of the steering wheel 9, respectively. The plurality of first base fabric joining sections 51 are formed by sewing and joining a plurality of predetermined portions 109 and 109 (see FIG. 8) that are spaced apart from each other in the circumferential direction of the first base fabric 41. The plurality of first base fabric joining sections 51 are formed in a linear shape from an outer circumferential edge 55 of the first base fabric 41 toward a center O. In other words, the plurality of first base fabric joining sections 51 are formed in a linear shape in the radial direction from the outer circumferential edges 55 of the first base fabrics 41, respectively.

Figure 4:
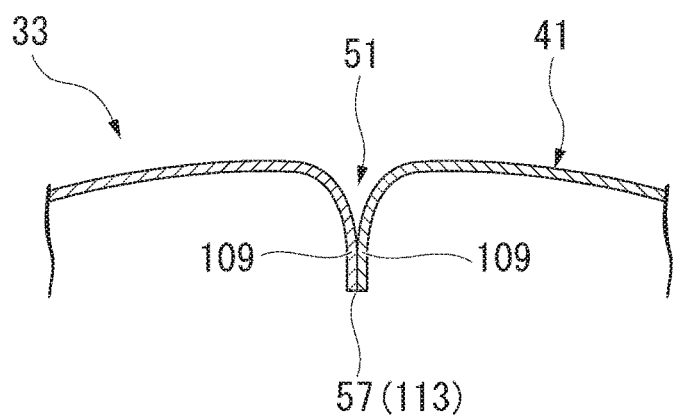
FIG. 4 is a cross-sectional view taken along line IV-IV in FIG. 3.

FIG. 4 is a cross-sectional view taken along line IV-IV in FIG. 3.

As shown in FIG. 4, first base fabric overlapping sections 57 are formed at positions corresponding to the plurality of first base fabric joining sections 51. The first base fabric overlapping sections 57 are formed by overlapping the portions 113 between the plurality of predetermined portions 109 and 109 in a circumferential direction. The first base fabric overlapping sections 57 are disposed in the airbag body 33.

Figure 5:
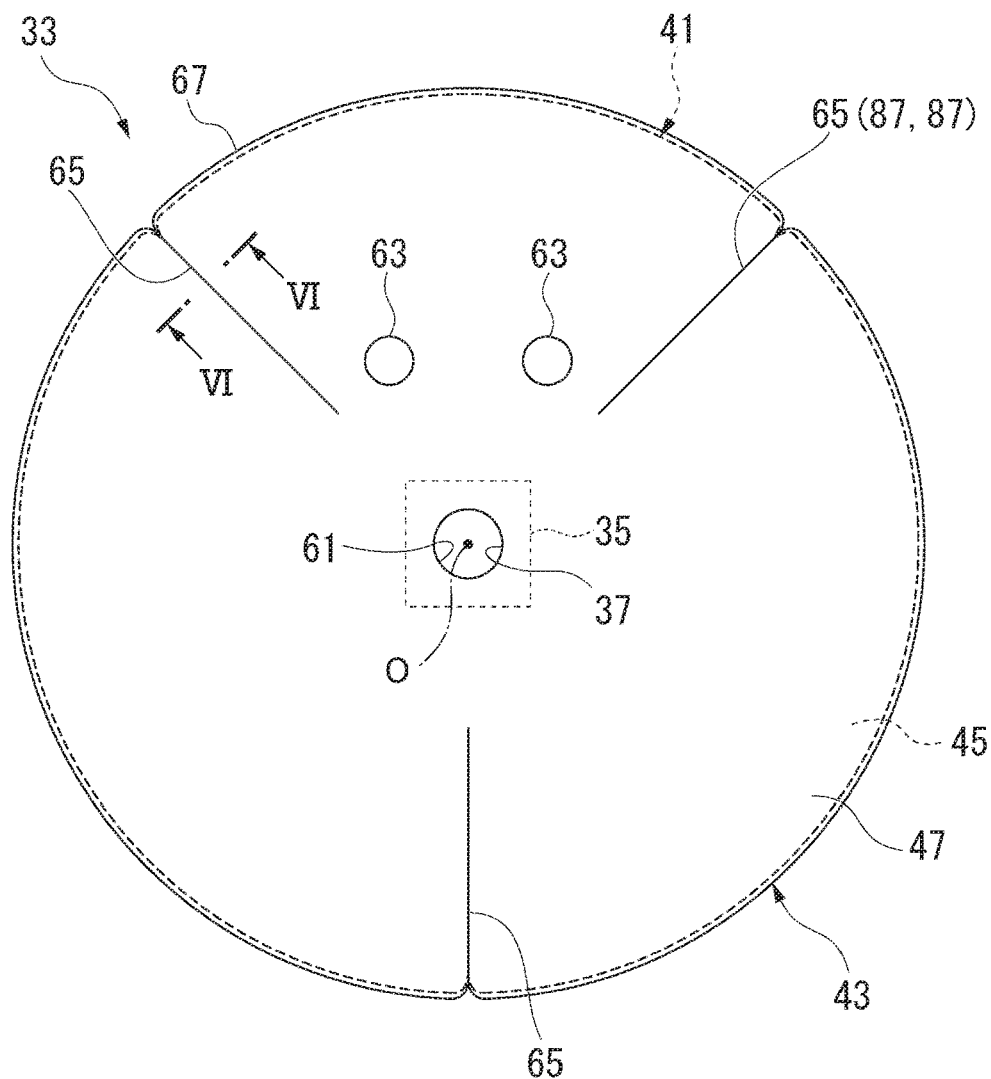
FIG. 5 is a plan view of the airbag body before deployment when seen from a side of a steering wheel.

FIG. 5 is a plan view showing the airbag body before deployment when seen from the side of the steering wheel.

As shown in FIG. 5, the second base fabric 43 is disposed on the side of the steering wheel 9 (see FIG. 1) upon deployment of the airbag body 33. The second base fabric 43 is a circular fabric when seen in a plan view. A size of the second base fabric 43 is the same as that of the first base fabric 41. A gas supply hole 61 is provided on a central portion of the second base fabric 43.

The fixing ring 35 is disposed on an inner surface of the second base fabric 43. The fixing ring 35 has a through-hole 37 formed in a central section thereof. The through-hole 37 is disposed at a position corresponding to the gas supply hole 61. The fixing ring 35 fixes the second base fabric 43 to the retainer 23 (see FIG. 2). The inflator 31 (see FIG. 2) is connected to the gas supply hole 61. Accordingly, a gas injected from the inflator 31 is supplied into the airbag body 33 from the gas supply hole 61.

A plurality of (in the embodiment, two) vent holes 63 are formed in a central portion of the second base fabric 43. Each of the vent holes 63 is formed in a circular shape. The vent holes 63 are closed by being adhered to a circumferential edge portion when the airbag body 33 is deployed. In addition, the vent holes 63 are opened by being pressed from the occupant and discharge the gas in the airbag body 33 when the deployed airbag body 33 constrains the occupant.

A plurality of second base fabric joining sections 65 are provided on the outer circumferential side of the second base fabric 43. The plurality of second base fabric joining sections 65 are disposed to be spaced apart from each other in the circumferential direction of the second base fabric 43. The plurality of second base fabric joining sections 65 are disposed to correspond to the plurality of first base fabric joining sections 51 (see FIG. 3), respectively.

The plurality of second base fabric joining sections 65 are disposed to correspond to the spoke sections 15 of the steering wheel 9 (see FIG. 1), respectively. The plurality of second base fabric joining sections 65 are formed by joining a plurality of predetermined portions 87 and 87 (see FIG. 8) spaced apart from each other in the circumferential direction of the second base fabric 43 to each other through sewing. The plurality of second base fabric joining sections 65 are formed in a linear shape from an outer circumferential edge 67 of the second base fabric 43 toward the center O. In other words, the plurality of second base fabric joining sections 65 are formed in a linear shape in the radial direction from the outer circumferential edge 67 of the second base fabric 43. The plurality of second base fabric joining sections 65 are formed to be longer than the plurality of first base fabric joining sections 51 (see FIG. 3), respectively.

Figure 6:
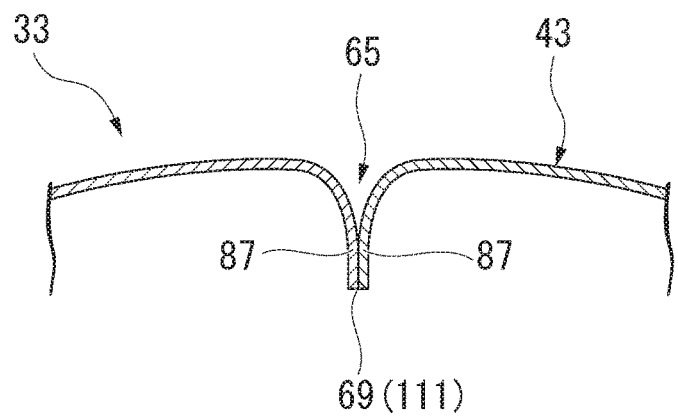
FIG. 6 is a cross-sectional view taken along line VI-VI in FIG. 5.

FIG. 6 is a cross-sectional view taken along line VI-VI in FIG. 5.

As shown in FIG. 6, second base fabric overlapping sections 69 are formed at positions corresponding to the plurality of second base fabric joining sections 65. The second base fabric overlapping sections 69 are formed by overlapping the portions 111 between the plurality of predetermined portions 87 and 87 in the circumferential direction. The second base fabric overlapping sections 69 are disposed in the airbag body 33.

Figure 7:
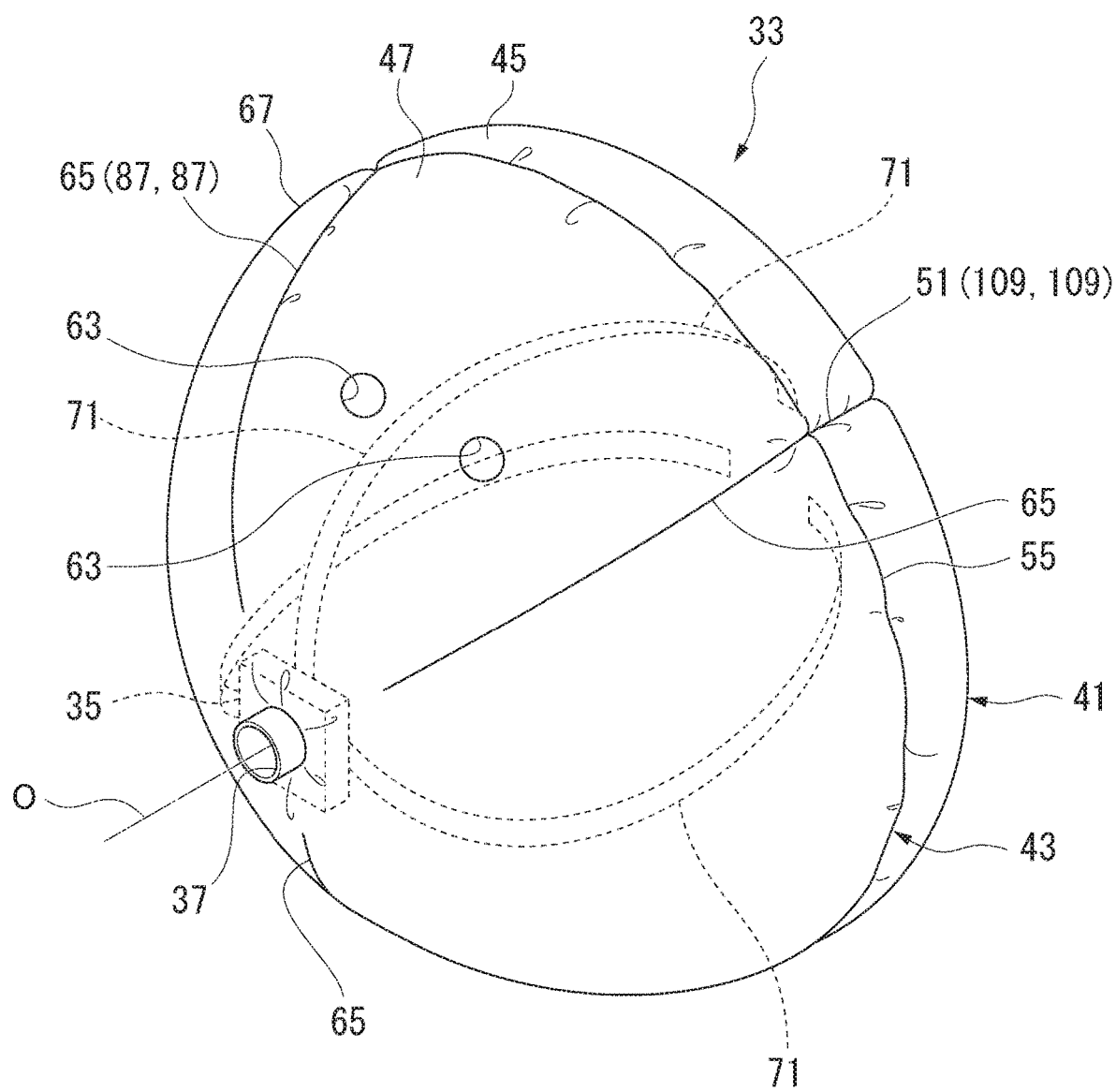
FIG. 7 is a perspective view showing the airbag body when being deployed.

FIG. 7 is a perspective view of the airbag body upon deployment.

As shown in FIG. 7, a plurality of restricting sections 71 are provided in the airbag body 33. The restricting sections 71 connect the first base fabric 41 and the second base fabric 43 and restrict deployment of the airbag body 33.

Specifically, the restricting sections 71 are members such as fabrics or the like formed in a belt shape. One end portions of the restricting sections 71 are fixed to the fixing ring 35 (a central portion of the second base fabric 43). The other end portions of the restricting sections 71 are fixed to a central portion of the first base fabric 41. The restricting sections 71 are slack in a state before the airbag body 33 is deployed, and extend as the airbag body 33 is deployed. When the restricting sections 71 extend to the limit, a distance between the first base fabric 41 and the second base fabric 43 of the airbag body 33 is restricted by the restricting sections 71. Accordingly, deployment of the airbag body 33 is restricted. That is, a deployment amount of the airbag body 33 is controlled by the length of the restricting sections 71.

Figure 8:
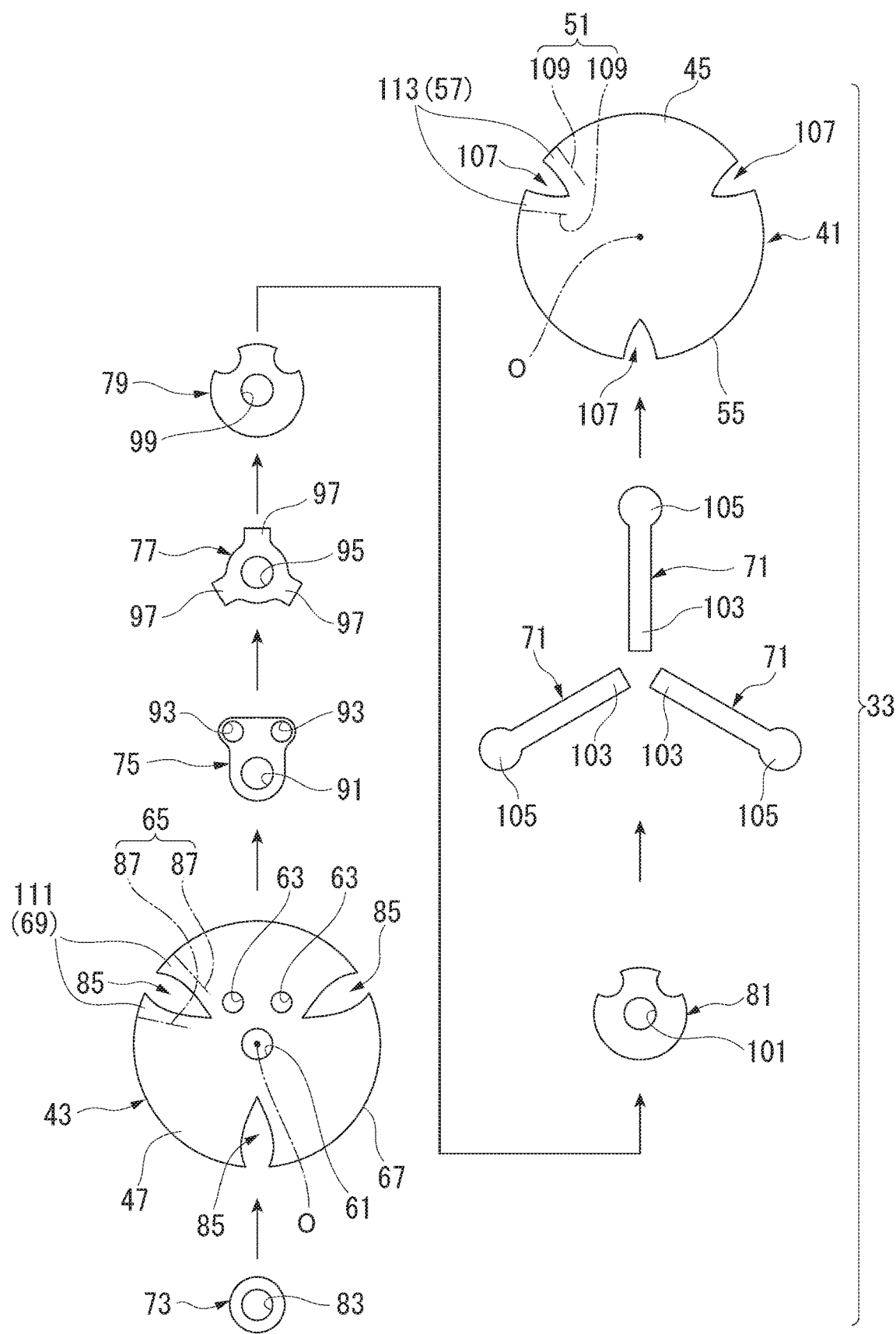
FIG. 8 is an exploded plan view of the airbag body.

FIG. 8 is an exploded plan view of the airbag body.

Next, a configuration of the airbag body 33 will be described in more detail using FIG. 8.

As shown in FIG. 8, the airbag body 33 includes an inflator patch 73, the second base fabric 43, a vent hole patch 75, a restricting section mount 77, a first intermediate patch 79, a second intermediate patch 81, the plurality of restricting sections 71 and the first base fabric 41.

The inflator patch 73 is formed of a fabric in an annular shape when seen in a plan view. An inflator patch through-hole 83 is formed in a central portion of the inflator patch 73.

The gas supply hole 61 and the plurality of vent holes 63 are formed in the second base fabric 43 as described above. The gas supply hole 61 corresponds to the inflator patch through-hole 83.

A plurality of second cutout sections 85 are formed on an outer circumferential side of the second base fabric 43. The plurality of second cutout sections 85 are formed from the outer circumferential edge 67 of the second base fabric 43 toward the center O. The plurality of second cutout sections 85 are formed to be cut out in a V shape from the outer circumferential edge 67 toward the center O. The second base fabric joining sections 65 (see FIG. 5) are formed by joining the predetermined portions 87 and 87 of both side portions of the plurality of second cutout sections 85 in the circumferential direction. The second base fabric overlapping sections 69 (see FIG. 6) are formed by overlapping a portion 111 between the predetermined portions 87 and 87 of both side portions.

The vent hole patch 75 is formed of a fabric in substantially a T shape when seen in a plan view. The vent hole patch first through-hole 91 is formed in one end portion of the vent hole patch 75. The vent hole patch first through-hole 91 corresponds to the gas supply hole 61 of the second base fabric 43. A plurality of (in the embodiment, two) vent hole patch second through-holes 93 are formed in the other end portion of the vent hole patch 75 to be spaced apart from each other in the widthwise direction. The plurality of vent hole patch second through-holes 93 correspond to the plurality of vent holes 63 formed in the second base fabric 43.

The restricting section mount 77 is formed of a fabric in a substantially triangular shape when seen in a plan view. A restricting section mount through-hole 95 is formed in the central portion of the restricting section mount 77. The restricting section mount through-hole 95 corresponds to the gas supply hole 61 of the second base fabric 43. A plurality of holding sections 97 are provided to be spaced apart from each other in the circumferential direction of the restricting section mount 77.

The first intermediate patch 79 is formed of a fabric in a substantially partially cutout circular shape when seen in a plan view. A first intermediate patch through-hole 99 is formed in the central portion of the first intermediate patch 79. The first intermediate patch through-hole 99 corresponds to the gas supply hole 61 of the second base fabric 43.

The second intermediate patch 81 is formed of a fabric in the same shape as that of the first intermediate patch 79. A second intermediate patch through-hole 101 is formed in the central portion of the second intermediate patch 81. The second intermediate patch through-hole 101 corresponds to the gas supply hole 61 of the second base fabric 43.

The plurality of restricting sections 71 are formed of a fabric in a belt shape. The plurality of restricting sections 71 are disposed at a pitch of about 120° radially, and one end portions 103 are held by the holding sections 97 of the restricting section mount 77, respectively. The other end portions 105 of the restricting sections 71 are formed in a circular shape.

A plurality of first cutout sections 107 are provided on the outer circumferential side of the first base fabric 41. The plurality of first cutout sections 107 are formed from the outer circumferential edge 55 of the first base fabric 41 toward the center O. The plurality of first cutout sections 107 are formed to be cutout in a V shape from the outer circumferential edge 55 toward the center O. The plurality of first cutout sections 107 are formed shallower than the plurality of second cutout sections 85 of the second base fabric 43. The first base fabric joining sections 51 (see FIG. 3) are formed by joining the predetermined portions 109 and 109 of both side portions of the plurality of first cutout sections 107 in the circumferential direction. The first base fabric overlapping sections 57 (see FIG. 4) are formed by overlapping a portion 113 between the predetermined portions 109 and 109 of both side portions.

Next, a method of manufacturing the airbag body 33 will be described in brief with reference to FIG. 8. Further, a method of manufacturing the airbag body 33 and a sequence of processes described below are exemplary and not limited thereto.

First, the inflator patch 73 and the second base fabric 43 overlap each other. Here, the gas supply hole 61 is aligned with the inflator patch through-hole 83.

Next, the second base fabric 43 and the vent hole patch 75 overlap each other. Here, the vent hole patch first through-hole 91 is aligned with the gas supply hole 61. In addition, the plurality of vent hole patch second through-holes 93 are aligned with the plurality of vent holes 63.

Next, the vent hole patch 75 and the restricting section mount 77 overlap each other. Here, the restricting section mount through-hole 95 is aligned with the vent hole patch first through-hole 91.

Next, the restricting section mount 77 and the first intermediate patch 79 overlap each other. Here, the first intermediate patch through-hole 99 is aligned with the restricting section mount through-hole 95.

Next, the first intermediate patch 79 and the second intermediate patch 81 overlap each other. Here, the second intermediate patch through-hole 101 is aligned with the first intermediate patch through-hole 99.

Next, the one end portions 103 of the plurality of restricting sections 71 are inserted between the plurality of holding sections 97 of the restricting section mount 77 and the surface of the second base fabric 43.

Next, the one end portions 103 of the plurality of restricting sections 71, the plurality of holding sections 97 of the restricting section mount 77 and the second base fabric 43 are sewed to each other. Accordingly, the one end portions 103 of the plurality of restricting sections 71 are fixed to the central portion of the second base fabric 43.

Next, the fixing ring 35 (see FIG. 5) and the second intermediate patch 81 overlap each other. Here, the through-hole 37 of the fixing ring 35 is aligned with the second intermediate patch through-hole 101. The fixing ring 35 fixes the second base fabric 43 to the retainer 23 (see FIG. 2).

Next, the other end portions 105 of the plurality of restricting sections 71 overlap the central portion of the first base fabric 41, and the other end portions 105 of the plurality of restricting sections 71 are sewed and fixed to the central portion of the first base fabric 41.

Next, in the second base fabric 43, the portions 111 between the predetermined portions 87 and 87 of both sides of the plurality of second cutout sections 85 overlap each other.

Next, the predetermined portions 87 and 87 of both side portions are sewed and joined to each other. Accordingly, the second base fabric joining sections 65 and the second base fabric overlapping sections 69 are formed.

Next, the portions 113 between the predetermined portions 109 and 109 of both side portions of the plurality of first cutout sections 107 in the first base fabric 41 overlap each other.

Next, the predetermined portions 109 and 109 of both side portions are sewed and joined to each other. Accordingly, the first base fabric joining sections 51 and the first base fabric overlapping sections 57 are formed.

Finally, the outer circumferential section 45 of the first base fabric 41 and the outer circumferential section 47 of the second base fabric 43 are sewed and joined to each other. Accordingly, the airbag body 33 is completed. Here, the first base fabric overlapping sections 57 and the second base fabric overlapping sections 69 are disposed inside the airbag body 33.

Next, an operation of the airbag body 33 of the embodiment will be described. In particular, hereinafter, when a large impact is input from a side obliquely in front of the vehicle 1 (for example, in the case of a so-called oblique collision) will be described.

When the collision detecting sensor detects an impact of the vehicle 1, a gas is supplied into the airbag body 33 from the inflator 31. Accordingly, the airbag body 33 is deployed and presses the rear cover 27 of the airbag device accommodating section 13.

The rear cover 27 is pressed by the airbag body 33 and broken along the tear line 29.

The airbag body 33 is deployed from between the broken tear lines 29 toward the driver's seat 5.

Accordingly, the restricting sections 71 are stretched between the first base fabric 41 and the second base fabric 43. The deployment of the airbag body 33 is restricted and terminated when the restricting sections 71 are stretched to the limit.

Figure 9:
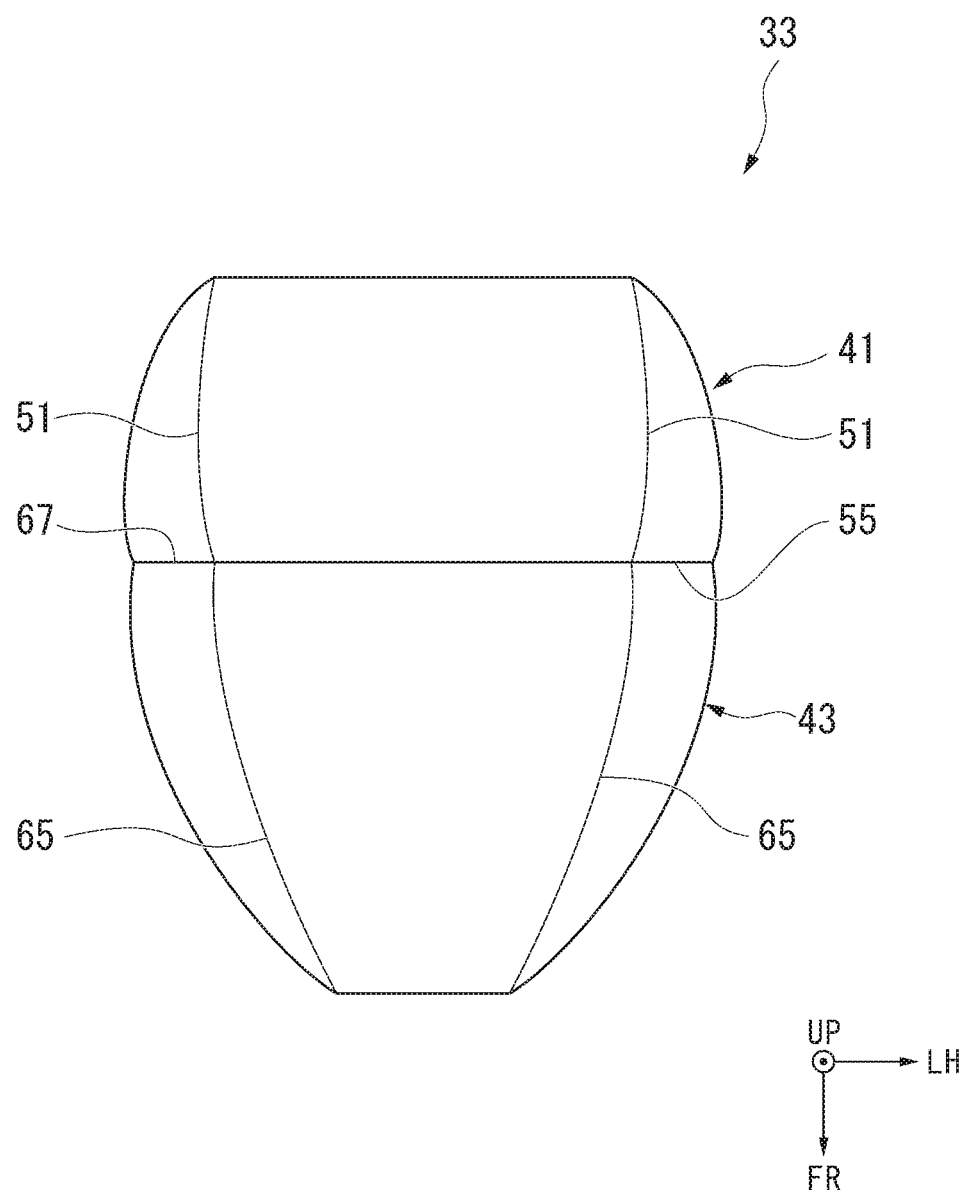
FIG. 9 is a plan view of the airbag body that is deployed.

FIG. 9 is a plan view of the deployed airbag body.

As shown in FIG. 9, the deployed airbag body 33 is formed in an elongated tubular shape in a thickness direction (i.e., the vehicle forward/rearward direction).

The first base fabric 41 is flatter than the second base fabric 43 and spreads in the widthwise direction. The first base fabric 41 has a width that is gradually narrowed from the outer circumferential edge 55 toward an occupant (i.e., a side behind the vehicle). The first base fabric joining sections 51 are disposed in a linear shape in the thickness direction of the airbag body 33 and the radial direction of the first base fabric 41.

In addition, the second base fabric 43 is formed in a tubular shape having a minimum diameter smaller than the first base fabric 41 and a thickness. The second base fabric 43 has a width that is gradually narrowed from the outer circumferential edge 67 toward the steering wheel 9 (a side in front of the vehicle). The second base fabric joining sections 65 are disposed in a linear shape in the thickness direction of the airbag body 33 and the radial direction of the second base fabric 43.

Figure 10:
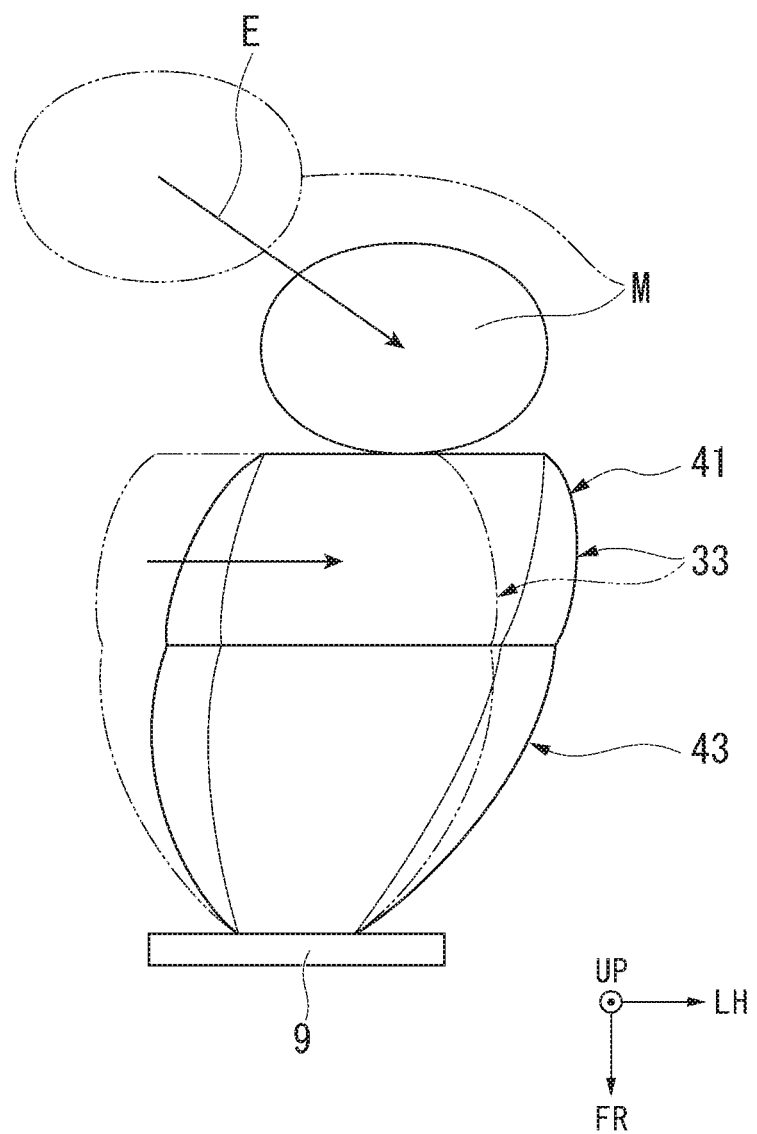
FIG. 10 is a view showing a state in which an occupant obliquely comes into contact with a deployed airbag body from side to the rear thereof.

FIG. 10 is a view showing a state in which an occupant obliquely comes into contact with the deployed airbag body from side to the rear thereof. Further, in FIG. 10, the occupant is a driver who is designated by reference character M and schematically shown. In addition, in FIG. 10, a state before the airbag body 33 and occupant M contact with each other is shown by a two-dot chain line, and a state after the airbag body 33 and occupant M contact with each other is shown by a solid line.

As shown in FIG. 10, for example, the case in which a large impact is input to the vehicle 1 (see FIG. 1) from a obliquely front side (for example, a so-called oblique collision) and the occupant M comes into contact with the airbag body 33 from a obliquely rear side (in the embodiment, a obliquely right rear side) will be described. When the occupant M comes into contact with the airbag body 33 from an obliquely rear side (see an arrow E), the airbag body 33 moves in a direction in which the occupant M moves (in the embodiment, a leftward direction, a direction of an arrow LH) using the steering wheel 9 as a starting point. Here, the second base fabric 43 of the deployed airbag body 33 has a minimum diameter smaller than the first base fabric 41 and a thickness. For this reason, the second base fabric 43 follows a movement of the occupant M by deforming the entirety leftward using the steering wheel 9 as a starting point while maintaining the tubular shape. In addition, the first base fabric 41 of the deployed airbag body 33 is flatter than the second base fabric 43 and spreads in the widthwise direction. For this reason, the first base fabric 41 stably supports the occupant M.

Next, an effect of the airbag device 17 of the embodiment will be described.

According to the embodiment, since the first base fabric joining sections 51 are provided on the first base fabric 41 and the second base fabric joining sections 65 are provided on the second base fabric 43, the airbag body 33 can be mainly deployed in the thickness direction of the airbag body 33 by restricting deployment of the airbag body 33 in the widthwise direction using the first base fabric joining sections 51 and the second base fabric joining sections 65. Accordingly, the deployed airbag body 33 is formed in a tubular shape having a thickness that is larger than that of the deployed airbag body in the related art. Accordingly, the airbag device 17 of the embodiment can follow a movement of the occupant M and can constrain the occupant M by providing a thickness to the airbag body 33 larger than that in the related art even when the occupant M obliquely comes into contact with the deployed airbag body 33.

In addition, according to the embodiment, the first cutout sections 107 are provided on the outer circumferential side of the first base fabric 41 from the outer circumferential edge 55 of the first base fabric 41 toward the center O and the predetermined portions 109 and 109 of both side portions of the first cutout sections 107 in the circumferential direction are joined to form the first base fabric joining sections 51. In addition, the second cutout sections 85 are provided on the outer circumferential side of the second base fabric 43 from the outer circumferential edge 67 of the second base fabric 43 toward the center O, and the predetermined portions 87 and 87 of both side portions of the second cutout sections 85 in the circumferential direction are joined to form the second base fabric joining sections 65. According to the configuration, an amount of the base fabric used can be reduced in comparison with the airbag body having no cutout section. Accordingly, the airbag body 33 of the embodiment can reduce a volume when folded and accommodated in comparison with the airbag body having no cutout section. Further, since the airbag body 33 of the embodiment can reduce an amount of the first base fabric 41 and the second base fabric 43 used in comparison with the airbag body having no cutout section, a contact between predetermined portions of the first base fabric 41 and the second base fabric 43 upon deployment can be minimized. Accordingly, the airbag device 17 of the embodiment can be smoothly deployed.

In addition, according to the embodiment, since a depth dimension of the second cutout sections 85 of the second base fabric 43 in the radial direction is larger than that of the first cutout sections 107 of the first base fabric 41 in the radial direction, when the airbag body 33 is deployed, the first base fabric 41 is flatter than the second base fabric 43 and spreads in the widthwise direction, and the second base fabric 43 has a tubular shape having a minimum diameter smaller than that of the first base fabric 41 and a thickness. Accordingly, in the airbag device 17 of the embodiment, even when the occupant M obliquely comes into contact with the deployed airbag body 33, since the tubular second base fabric 43 having a thickness larger than that of the first base fabric 41 can follow a movement of the occupant M while the first base fabric 41 stably support the occupant M, the occupant M can be effectively constrained.

In addition, according to the embodiment, the first base fabric overlapping sections 57 formed by overlapping the portions 113 between the predetermined portions 109 and 109 of the first base fabric 41 and the second base fabric overlapping sections 69 formed by overlapping the portions 111 between the predetermined portions 87 and 87 of the second base fabric 43 are disposed in the airbag body 33. Accordingly, the airbag body 33 can prevent interference of the first base fabric overlapping sections 57 and the second base fabric overlapping sections 69 with the other peripheral members outside the airbag body 33 upon deployment. Accordingly, the airbag device 17 of the embodiment can be smoothly deployed.

In addition, according to the embodiment, the first base fabric joining sections 51 are formed in a linear shape in the radial direction of the first base fabric 41 from the outer circumferential edge 55 of the first base fabric 41 toward the center O. In addition, the second base fabric joining sections 65 are formed in a linear shape in the radial direction of the second base fabric 43 from the outer circumferential edge 67 of the second base fabric 43 toward the center O. Accordingly, the airbag body 33 is deployed in the thickness direction while further restricting deployment in the widthwise direction. Accordingly, the airbag device 17 of the embodiment can follow a movement of the occupant M and constrain the occupant M even when the occupant M obliquely comes into contact with the deployed airbag body 33.

In addition, according to the embodiment, the restricting sections 71 configured to restrict deployment of the airbag body 33 by connecting the first base fabric 41 and the second base fabric 43 are provided in the airbag body 33. Accordingly, the airbag body 33 can restrict a deployment amount of the airbag body 33 in the thickness direction using the restricting sections 71 so that, for example, a side surface of the airbag body 33 is slacked when the airbag body 33 is deployed. Accordingly, even when the occupant M obliquely comes into contact with the deployed airbag body 33, since the airbag device 17 of the embodiment easily follows the occupant M by stabilizing a deployment movement of the airbag body 33, the occupant M can be constrained to follow a movement of the occupant M.

In addition, according to the embodiment, the airbag device 17 is disposed inside the steering wheel 9. Accordingly, the airbag device 17 of the embodiment can follow a movement of the driver and constrain the driver even when the driver who is the occupant M obliquely comes into contact with the deployed airbag body 33.

In addition, according to the embodiment, the first base fabric joining sections 51 and the second base fabric joining sections 65 are disposed at positions corresponding to the spoke sections 15 of the steering wheel 9. Accordingly, when the airbag body 33 is deployed, since the deployment amount of the first base fabric joining sections 51 and the second base fabric joining sections 65 is minimized to a lower level than the deployment amount of the portion other than the first base fabric joining sections 51 and the second base fabric joining sections 65, interference of the first base fabric joining sections 51 and the second base fabric joining sections 65 with the spoke sections 15 upon deployment can be minimized. Accordingly, the airbag device 17 of the embodiment can be smoothly deployed. In addition, when the airbag body 33 is deployed, since the deployment amount of the first base fabric joining sections 51 and the second base fabric joining sections 65 is minimized to a lower level than the deployment amount of the portion other than the first base fabric joining sections 51 and the second base fabric joining sections 65, reaction with respect to the spoke sections 15 and rebounding from the spoke sections 15 when the airbag body 33 is deployed are minimized. Accordingly, the airbag device 17 of the embodiment can follow a movement of the occupant M and constrain the occupant M even when the occupant M obliquely comes into contact with the deployed airbag body 33 while stabilizing a deployment movement of the airbag body 33.

Further, the technical scope of the present invention is not limited to the above-mentioned embodiment and various modifications may be made without departing from the spirit of the present invention.

In the embodiment, while the first base fabric joining sections 51 and the second base fabric joining sections 65 serving as the joining sections are provided on the first base fabric 41 and the second base fabric 43, the joining section may be provided on any one of the first base fabric 41 and the second base fabric 43.

In addition, in the embodiment, while three of the first base fabric joining sections 51 and the second base fabric joining sections 65 serving as the joining sections are provided on the first base fabric 41 and the second base fabric 43, the number of the joining sections is not limited to the above-mentioned embodiment.

In addition, in the embodiment, while stitching (sewing) is employed as the method of joining the first base fabric 41 and the second base fabric 43, the joining method is not particularly limited, and for example, an adhesive agent or the like may be used.

In the embodiment, while the present invention is applied to the airbag device 17 provided in the steering wheel 9, application of the present invention is not limited thereto.

Accordingly, for example, the present invention may be applied to an airbag device provided in a dashboard on the side of the passenger seat, a side curtain airbag device provided along an edge side of a window of the vehicle, or the like.

In addition, it is possible to appropriately replace the components in the above-mentioned embodiment with known components without departing from the spirit of the present invention.

INDUSTRIAL APPLICABILITY

According to the above-mentioned airbag device, even when the occupant obliquely comes into contact with the deployed airbag body, an occupant can be constrained to follow a movement of the occupant.

REFERENCE SIGNS LIST

9 Steering wheel
15 Spoke section
17 Airbag device
33 Airbag body
41 First base fabric (base fabric)
43 Second base fabric (base fabric)
45 Outer circumferential section
47 Outer circumferential section
51 First base fabric joining section (joining section)
55 Outer circumferential edge
57 First base fabric overlapping section (overlapping section)
65 Second base fabric joining section (joining section)
67 Outer circumferential edge
69 Second base fabric overlapping section (overlapping section)
71 Restricting section
85 Second cutout section
107 First cutout section
87 Predetermined portion
109 Predetermined portion
M Occupant
O Center

What is claim is:

1. An airbag device comprising an airbag body having a first base fabric and a second base fabric,
    wherein the first base fabric and the second base fabric have outer circumferential sections that are joined to each other while overlapping each other,
    the first base fabric and the second base fabric have:
    cutout sections provided in a radial direction of the first base fabric and the second base fabric from outer circumferential edges to centers of the first base fabric and the second base fabric; and
    joining sections formed by joining both side portions of the cutout sections in a circumferential direction, the joining sections being formed in a linear shape in the radial direction of the first base fabric and the second base fabric from the outer circumferential edges toward the centers of the first base fabric and the second base fabric,
    the plurality of joining sections are provided to be spaced apart in the circumferential direction of the first base fabric and the second base fabric,
    a first cutout section is provided as the cutout section in the first base fabric,
    a second cutout section is provided as the cutout section in the second base fabric, and
    a depth dimension of the second cutout section of the second base fabric in the radial direction is larger than that of the first cutout section of the first base fabric in the radial direction.

2. The airbag device according to claim 1, wherein the first base fabric faces an occupant upon deployment of the airbag body, and
    the second base fabric is disposed on a side of the first base fabric away from the occupant.

3. The airbag device according to claim 1, wherein portions between a plurality of predetermined portions of the both side portions of the cutout sections in the circumferential direction overlap each other to form an overlapping section, and
    the overlapping section is disposed in the airbag body.

4. The airbag device according to claim 1, wherein a restricting section configured to connect the plurality of base fabrics and restrict deployment of the airbag body is provided in the airbag body.

5. The airbag device according to claim 1, wherein the airbag device is disposed in a steering wheel.

6. The airbag device according to claim 1, wherein, when the airbag body is deployed, the first base fabric is flatter than the second base fabric and spreads in a widthwise direction, and the second base fabric has a tubular shape having a minimum diameter and thickness larger than the first base fabric.

7. An airbag device comprising an airbag body having a first base fabric and a second base fabric, the airbag device is disposed in a steering wheel,
    wherein the first base fabric and the second base fabric have outer circumferential sections that are joined to each other while overlapping each other,
    the first base fabric and the second base fabric have:
    cutout sections provided in a radial direction of the first base fabric and the second base fabric from outer circumferential edges to centers of the first base fabric and the second base fabric; and
    joining sections formed by joining both side portions of the cutout sections in a circumferential direction,
    the plurality of joining sections are provided to be spaced apart in the circumferential direction of the first base fabric and the second base fabric, wherein the joining sections are disposed at positions corresponding to spoke sections of the steering wheel in a state in which the airbag body is deployed,
    a first cutout section is provided as the cutout section in the first base fabric,
    a second cutout section is provided as the cutout section in the second base fabric, and
    a depth dimension of the second cutout section of the second base fabric in the radial direction is larger than that of the first cutout section of the first base fabric in the radial direction.

* * * * *